United States Patent
Ziebarth et al.

(10) Patent No.: US 10,642,673 B2
(45) Date of Patent: May 5, 2020

(54) HARDWARE ERROR DETECTION ON A HIGH-SPEED SERIAL CONNECTION

(71) Applicant: International Business Machines Corporation, Armonk, NY (US)

(72) Inventors: Donald J. Ziebarth, Rochester, MN (US); Jeremy T. Ekman, West Concord, MN (US); Trevor J. Timpane, Rochester, MN (US); George R. Zettles, IV, Rochester, MN (US)

(*) Notice: Subject to any disclaimer, the term of this patent is extended or adjusted under 35 U.S.C. 154(b) by 188 days.

(21) Appl. No.: 15/860,201

(22) Filed: Jan. 2, 2018

(65) Prior Publication Data

US 2019/0205194 A1    Jul. 4, 2019

(51) Int. Cl.
*G06F 11/00* (2006.01)
*G06F 11/07* (2006.01)
*G06F 13/42* (2006.01)

(52) U.S. Cl.
CPC ........ *G06F 11/076* (2013.01); *G06F 11/0745* (2013.01); *G06F 11/0772* (2013.01); *G06F 13/4291* (2013.01); *G06F 2213/0008* (2013.01); *G06F 2213/0016* (2013.01)

(58) Field of Classification Search
CPC .............. G06F 11/076; G06F 11/0745; G06F 11/0772; G06F 11/0709; G06F 11/0751; G06F 11/0754; G06F 11/0766; G06F 13/4291; G06F 2213/0016; G06F 2213/0002; G06F 2213/0008; G06F 2213/0012

See application file for complete search history.

(56) References Cited

U.S. PATENT DOCUMENTS

| 4,918,692 | A | | 4/1990 | Hidaka et al. |
| 5,305,323 | A | * | 4/1994 | Lada ............. G06F 11/076 714/704 |
| 6,477,609 | B1 | | 11/2002 | Reiss et al. |
| 7,231,558 | B2 | | 6/2007 | Gentieu et al. |

(Continued)

FOREIGN PATENT DOCUMENTS

EP    0280254 A2    8/1988

OTHER PUBLICATIONS

Wright, *Finite State Machines*, Course Notes, CSC216, Summer 2005 (month unknown), North Carolina State University (online), pp. 1-28, URL: http://www4.ncsu.edu/~drwrigh3/docs/courses/csc216/fsm-notes.pdf [accessed Dec. 5, 2017], Raleigh, North Carolina.

*Primary Examiner* — Anthony J Amoroso

(57) ABSTRACT

Hardware error detection on a high-speed serial (HSS) connection including tracking, by a hardware state machine on a HSS receiver, errors in a data stream, wherein tracking, by the hardware state machine, the errors in the data stream comprises, for each sample of incoming data: inspecting, by the hardware state machine, a detected error indicator in a test control register to determine whether an error has been detected in the sample; incrementing, by the hardware state machine, an error count in a hardware error counter if the test control register indicates an error has been detected in the sample; clearing, by the hardware state machine, the detected error indicator if the test control register indicates an error has been detected in the sample; and incrementing, by the hardware state machine, a sample count in a sample count register.

20 Claims, 6 Drawing Sheets

(56) References Cited

U.S. PATENT DOCUMENTS

| | | | |
|---|---|---|---|
| 7,246,274 B2 * | 7/2007 | Kizer | G01R 31/31709 |
| | | | 714/704 |
| 7,404,115 B2 | 7/2008 | Boudon et al. | |
| 7,464,307 B2 * | 12/2008 | Nejedlo | G01R 31/31717 |
| | | | 714/712 |
| 8,566,645 B2 | 10/2013 | Rentschler et al. | |
| 2003/0074620 A1 | 4/2003 | Dorsey | |
| 2003/0227965 A1 | 12/2003 | Webb et al. | |
| 2017/0308385 A1 | 10/2017 | Brown | |

* cited by examiner

Hardware State Machine 216

Track, By A Hardware State Machine On An HSS Receiver, Errors In A Data Stream, Where Tracking, By The Hardware State Machine, The Errors In The Data Stream Comprises, For Each Sample Of Incoming Data: 402

Inspect, By The Hardware State Machine, A Detected Error Indication In A Test Control Register To Determine Whether An Error Has Been Detected In The Sample 404

Inspect, By The Hardware State Machine, An Active Test Indication To Determine Whether A Test Is Active 502

Increment, By The Hardware State Machine, An Error Count In A Hardware Error Counter If The Test Control Register Indicates An Error Has Been Detected In The Sample 406

Pulse An Input Signal For The Sample Count Register For At Least One Clock Cycle 504

Clear, By The Hardware State Machine, The Detected Error Indication If The Test Control Register Indicates An Error Has Been Detected In The Sample 408

Increment, By The Hardware State Machine, A Sample Count In A Sample Count Register 410

Pulse An Input Signal For The Hardware Error Counter For At Least One Clock Cycle 506

Provide, By The Hardware State Machine To Firmware On The HSS Receiver, An Error Rate For The Data Stream Based On The Error Count In The Hardware Error Counter And The Sample Count In The Sample Count Register 412

FIG. 5

HARDWARE ERROR DETECTION ON A HIGH-SPEED SERIAL CONNECTION

BACKGROUND

Field of the Invention

The field of the invention is data processing, or, more specifically, methods, apparatus, and products for hardware error detection on a high-speed serial (HSS) connection.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

With an increase in speed across high-speed communications busses comes a decrease in the tolerance of errors detected over time. Traditional ways of measuring errors may be insufficient to detect and record errors occurring at modern transfer speeds.

SUMMARY

Methods, systems, and apparatus for hardware error detection on a high-speed serial (HSS) connection are disclosed in this specification. Hardware error detection on a HSS connection includes tracking, by a hardware state machine on a HSS receiver, errors in a data stream, wherein tracking, by the hardware state machine, the errors in the data stream comprises, for each sample of incoming data: inspecting, by the hardware state machine, a detected error indicator in a test control register to determine whether an error has been detected in the sample; incrementing, by the hardware state machine, an error count in a hardware error counter if the test control register indicates an error has been detected in the sample; clearing, by the hardware state machine, the detected error indicator if the test control register indicates an error has been detected in the sample; and incrementing, by the hardware state machine, a sample count in a sample count register; and providing, by the hardware state machine to firmware on the HSS receiver, an error rate for the data stream based on the error count in the hardware error counter and the sample count in the sample count register.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating an exemplary method for hardware error detection on a HSS connection according to embodiments of the present invention.

DETAILED DESCRIPTION

Figure 1:
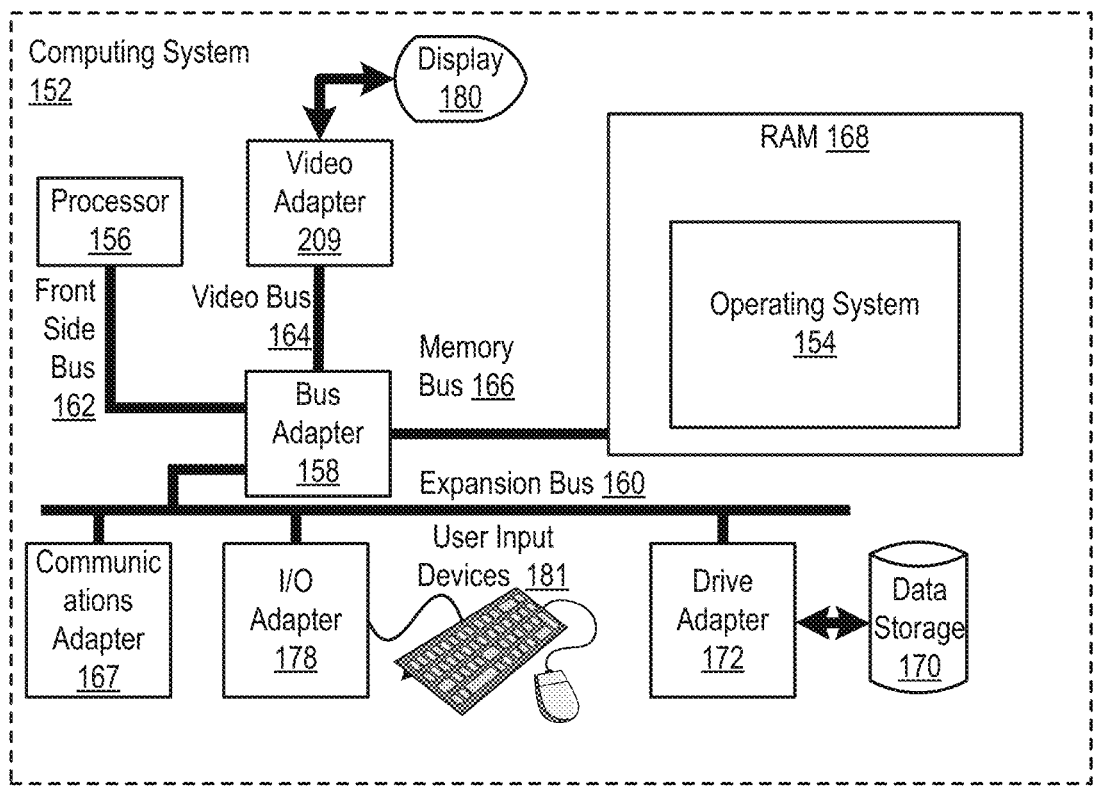
FIG. 1 sets forth a block diagram of an example system configured for hardware error detection on a high-speed serial (HSS) connection according to embodiments of the present invention.

Exemplary methods, apparatus, and products for hardware error detection on a high-speed serial (HSS) connection in accordance with the present invention are described with reference to the accompanying drawings, beginning with FIG. 1. FIG. 1 sets forth a block diagram of automated computing machinery comprising an exemplary computing system (152) configured for hardware error detection on a HSS connection according to embodiments of the present invention. The computing system (152) of FIG. 1 includes at least one computer processor (156) or 'CPU' as well as random access memory (168) (RAM') which is connected through a high-speed memory bus (166) and bus adapter (158) to processor (156) and to other components of the computing system (152).

Stored in RAM (168) is an operating system (154). Operating systems useful in computers configured for hardware error detection on a HSS connection according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for hardware error detection on a HSS connection according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for hardware error detection on a HSS connection according to embodiments of the present invention include modems for wired dial-up communications, Ethernet (IEEE 802.3) adapters for wired data communications, and 802.11 adapters for wireless data communications.

Figure 2:
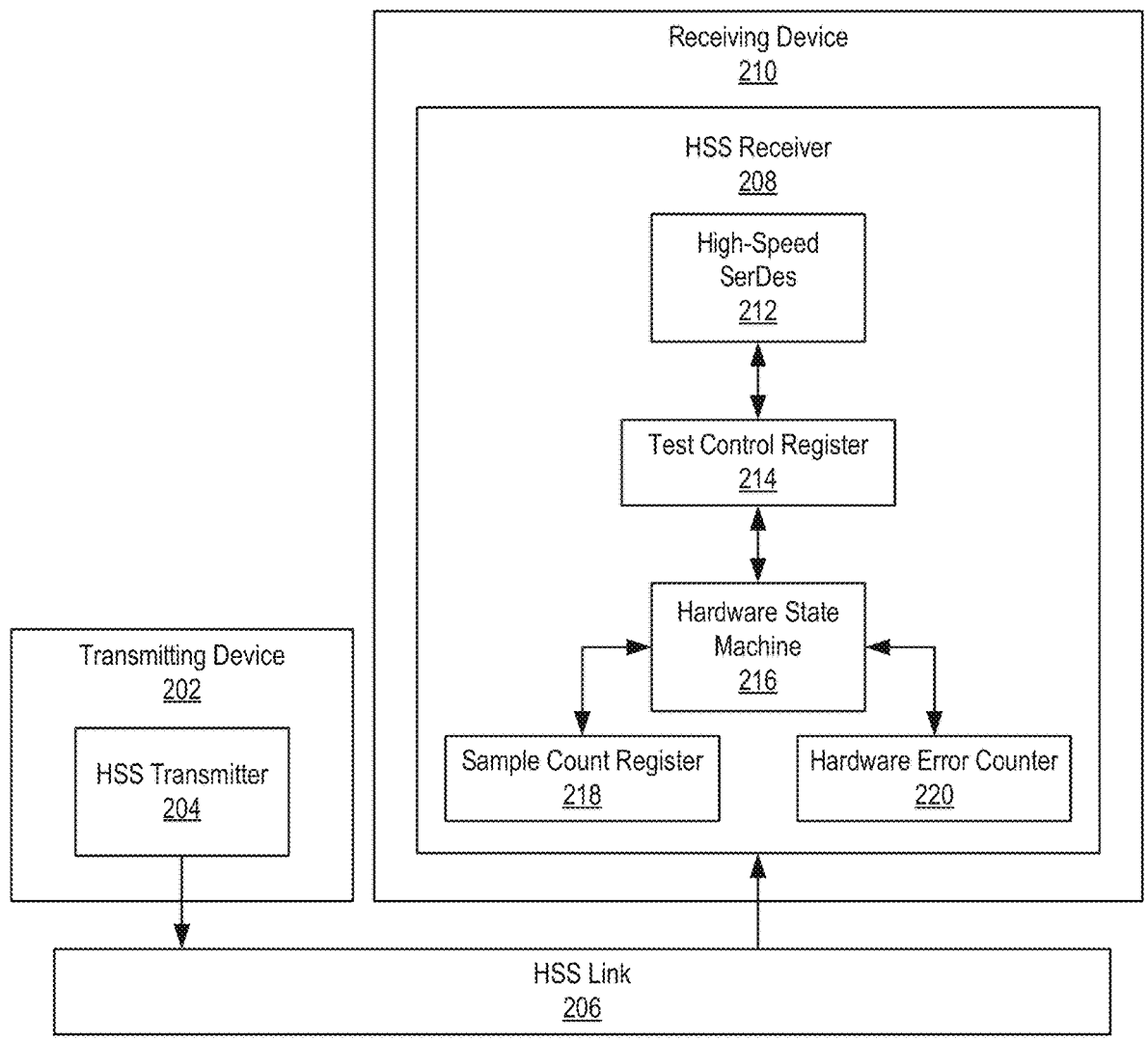
FIG. 2 sets forth a block diagram of an example system configured for hardware error detection on a HSS connection according to embodiments of the present invention.

FIG. 2 shows an exemplary system for hardware error detection on a HSS connection according to embodiments of the present invention. As shown in FIG. 2, the exemplary system includes a transmitting device (202) with a HSS transmitter (204), a HSS link (206), and a receiving device (210) with a HSS receiver (208). The HSS receiver (208) includes a high-speed serializer/deserializer (SerDes), a test control register (214), a hardware state machine (216), a sample count register (218), and a hardware error counter (220).

FIG. 2 depicts an exemplary system in which transmitting device (202) is transmitting a data stream to receiving device (210). However, the transmitting device (202), HSS transmitter (204), HSS receiver (208), and receiving device (210) may be implemented as devices capable of two-way communication over HSS link (206).

The transmitting device (202) is a device capable of initiating a data stream to the receiving device (210) via the HSS transmitter (204). The transmitting device (202) may be an endpoint on a HSS link (206), such as, for example, a serial attached small computer systems interface (SCSI) device, a serial advanced technology attachment (SATA) device, or a peripheral component interface (PCI) device. The transmitting device (202) may be also be an expander on a HSS link (206) such as a switch or router.

The HSS transmitter (204) is hardware or an aggregation of hardware and software that prepares data, such as a data stream, from a transmitting device (202) for transmission on the HSS link (206) to the HSS receiver (208). The HSS transmitter (204) may be, for example, a serial attached SCSI transmitter, a SATA transmitter, a PCI transmitter, Ethernet transmitter, or fiberchannel transmitter. Further, the HSS transmitter (204) may be part of a HSS adapter.

The HSS link (206) is a communications bus capable of transferring a data stream serially from the HSS transmitter (204) to the HSS receiver (208). The HSS link (206) may be, for example, a serial attached SCSI bus, a SATA bus, a PCI bus, Ethernet bus, or fiberchannel bus.

The HSS receiver (208) is hardware or an aggregation of hardware and software that receives data, such as a data stream, on the HSS link (206) from a HSS transmitter (204) addressed to the receiving device (210). The HSS receiver (208) may be, for example, a serial attached SCSI receiver, a SATA receiver, a PCI receiver, Ethernet receiver, or fiberchannel receiver. The HSS receiver (208) may be implemented, for example, on one end of any of the high-speed busses described in FIG. 1. Further, the HSS receiver (208) may be part of a HSS adapter.

The high-speed SerDes (212) is hardware that serializes outgoing data streams and deserializes incoming serialized data streams. The high-speed SerDes (212) may convert incoming data into a data stream formatted for use by other elements on the HSS receiver (208). The high-speed SerDes (212) may be a physical layer transceiver that operates at the physical layer of the open systems interconnection (OSI) model. Specifically, the high-speed SerDes (212) may operate at the physical layer of a high-speed serial protocol, such as, for example, serial attached SCSI, SATA, PCI, Ethernet protocol, or fiberchannel protocol.

The test control register (214) is a hardware storage device that stores information about testing conditions and the data stream. The test control register (214) may include a detected error indicator, a pattern synchronization indicator, and a detected error indicator reset. The detected error indicator is data within the test control register (214) that indicates whether error detecting logic (e.g., within the high-speed SerDes (212)) has detected an error. During the process of deserialization, the error detecting logic may compare the data received to patterns of data expected to be received. As the high-speed SerDes (212) processes the incoming data, if the incoming data does not match the expected data, then the error detecting logic indicates, in the test control register (214), that an error has been detected in the data stream.

Each time the error detecting logic detects an error, the error detecting logic may set a detected error indicator in the test control register to active, indicating that an error has been detected. The detected error indicator may be a binary indicator in the test control register that remains set until the detected error indicator is reset. If an additional error is detected by the error detecting logic, the error detecting logic sets or confirms that the detected error indicator indicates an error has been detected. Further, unless the detected error indicator is reset, there may be no indication in the test control register that more than one error has been detected.

The test control register (214) may include a detected error indicator reset. The detected error indicator reset is part of a mechanism by which the detected error indicator is reset. The detected error indicator reset may be binary toggle able to be altered by elements external to the test control register (214) and high-speed SerDes (212). Other elements on the HSS receiver (208) may toggle the detected error indicator reset in order to initiate a reset of the detected error indicator. For example, the hardware state machine (216) may read the detected error indictor, record the error, and then toggle the detected error indicator reset. Logic within the test control register (214) or associated with the test control register (214) may then react to the toggled detected error indicator reset by resetting the detected error indictor. Thereafter, the error detecting logic (e.g., within the high-speed SerDes (212) may record a subsequent error by setting the detected error indicator.

The pattern synchronization indicator is data within the test control register (214) that indicates whether the error detecting logic is actively able to detect errors in the incoming data stream. The pattern synchronization indicator may be a binary indication that the error detecting logic is actively testing a data stream and pattern synchronization has been achieved. Pattern synchronization refers to a state in which the error detecting logic has matched the incoming data stream to a pattern of expected data. A deviation from the pattern is a detected error. If the pattern synchronization indicator is active, then the high-speed SerDes (212) is receiving a data stream and the error detecting logic is testing the data stream for errors. If the pattern synchronization indicator is inactive, then the high-speed SerDes (212) may not be receiving a data stream or the error detecting logic is not testing the data stream for errors.

The hardware state machine (216) is hardware logic that tracks errors in the incoming data stream, stores an error count of detected errors in the hardware error counter, and stores a sample count in the sample count register (218). The hardware state machine (216) performs tasks based on the current state of the hardware state machine (216). The hardware state machine (216) operates just above the physical layer of the OSI model, at the boundary between the physical layer and the link layer. The hardware state machine (216) may operate at the link layer just above the physical layer of the OSI model. Specifically, the hardware state machine (216) may operate at the link layer of a high-speed serial protocol, such as, for example, serial attached SCSI, SATA, PCI, Ethernet protocol, or fiberchannel protocol.

The hardware state machine (216) may be a hardware component of an integrated circuit within the HSS receiver (208). Specifically, the hardware state machine (216) may be a configuration of logical gates with an integrated circuit. The integrated circuit may be a field-programmable gate array (FPGA) or application-specific integrated circuit (ASIC). Further, the hardware state machine (216) may be on the same integrated circuit as the high-speed SerDes (212). Specifically, a single integrated circuit may include the hardware state machine (216) and the high-speed SerDes (212). The same integrated circuit may also include the test control register (214), the sample count register (218), and the hardware error counter (220).

The sample count register (218) is a hardware register that stores a value (i.e., sample count) indicating the number of samples counted by the hardware state machine (216). The sample count register (218) may be incremented based on signals received from the hardware state machine (216). Specifically, the hardware state machine (216) may pulse an input signal for the sample count register (218) for one clock cycle or more than one clock cycle in order to increment the sample count register (218) one unit.

The hardware error counter (220) is a hardware register that stores a value (i.e., error count) indicating the number of errors counted by the hardware state machine (216). The hardware error counter (220) may be incremented based on signals received from the hardware state machine (216). Specifically, the hardware state machine (216) may pulse an input signal for the hardware error counter (220) for one clock cycle or more than one clock cycle in order to increment the hardware error counter (220) one unit.

The receiving device (210) is a device capable of receiving the data stream from the transmitting device (202) via the HSS receiver (208). The receiving device (210) may be an endpoint on a HSS link (206), such as, for example, a serial attached SCSI device, a SATA device, or a PCI device.

Figure 3:
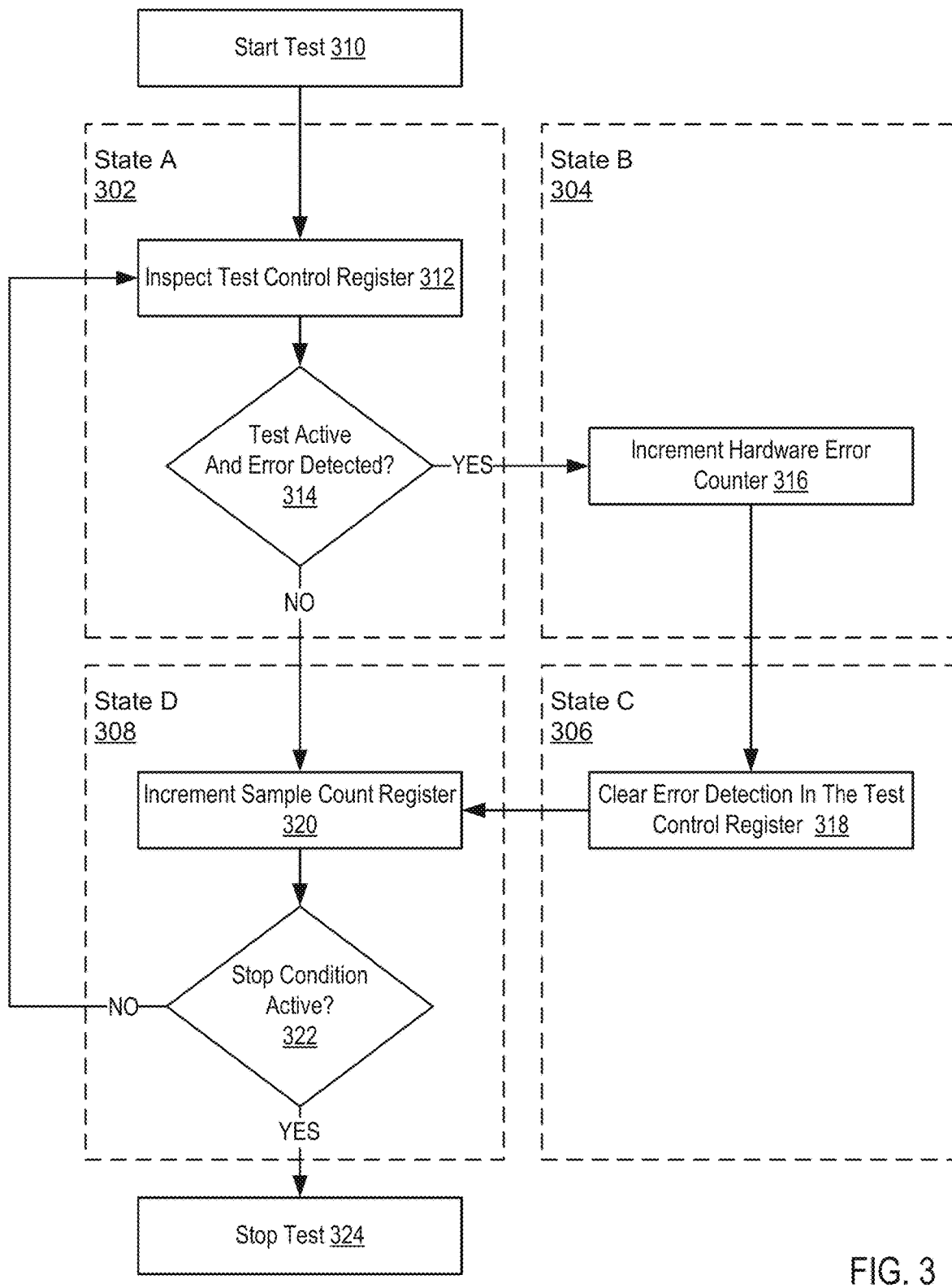
FIG. 3 sets forth a flow chart illustrating an exemplary state machine for hardware error detection on a HSS connection according to embodiments of the present invention.

FIG. 3 sets forth a flow chart illustrating an exemplary state machine for hardware error detection on a HSS connection according to embodiments of the present invention. Specifically, FIG. 3 shows the states and actions of a hardware state machine, such as the hardware state machine described in FIG. 2. As shown in FIG. 3, the exemplary state machine includes four states: state A (302), state B (304), state C (306), and state D (308).

The test is started (310) by firmware that activates the hardware state machine. The hardware state machine begins in state A (302) and inspects the test control register (312) for the detected error indicator and pattern synchronization indicator. The hardware state machine then determines whether both the detected error indicator and the pattern synchronization indicator are active (314). If both the detected error indicator and the pattern synchronization indicator are active, then the hardware state machine transitions to state B (304). If either the detected error indicator or the pattern synchronization indicator are inactive, then the hardware state machine transitions to state D (308).

During state B (304) the hardware state machine increments the error count in the hardware error counter (316) and transitions to state C (306). During state C (306), the hardware state machine clears the detected error indicator in the test control register (318) (e.g., by toggling the detected error indicator reset) and transitions to state D (308).

During state D (308), the hardware state machine increments the sample count in the sample count register (320) and determines whether a stop condition is active (322). A stop condition is a condition that, if satisfied, would stop the test. Examples of stop conditions include taking a threshold number of samples or an expiration of an amount of time provided for the test. If a stop condition is active, the test is stopped (324). If a stop condition is not active, the hardware state machine transitions back to state A (302).

Figure 4:
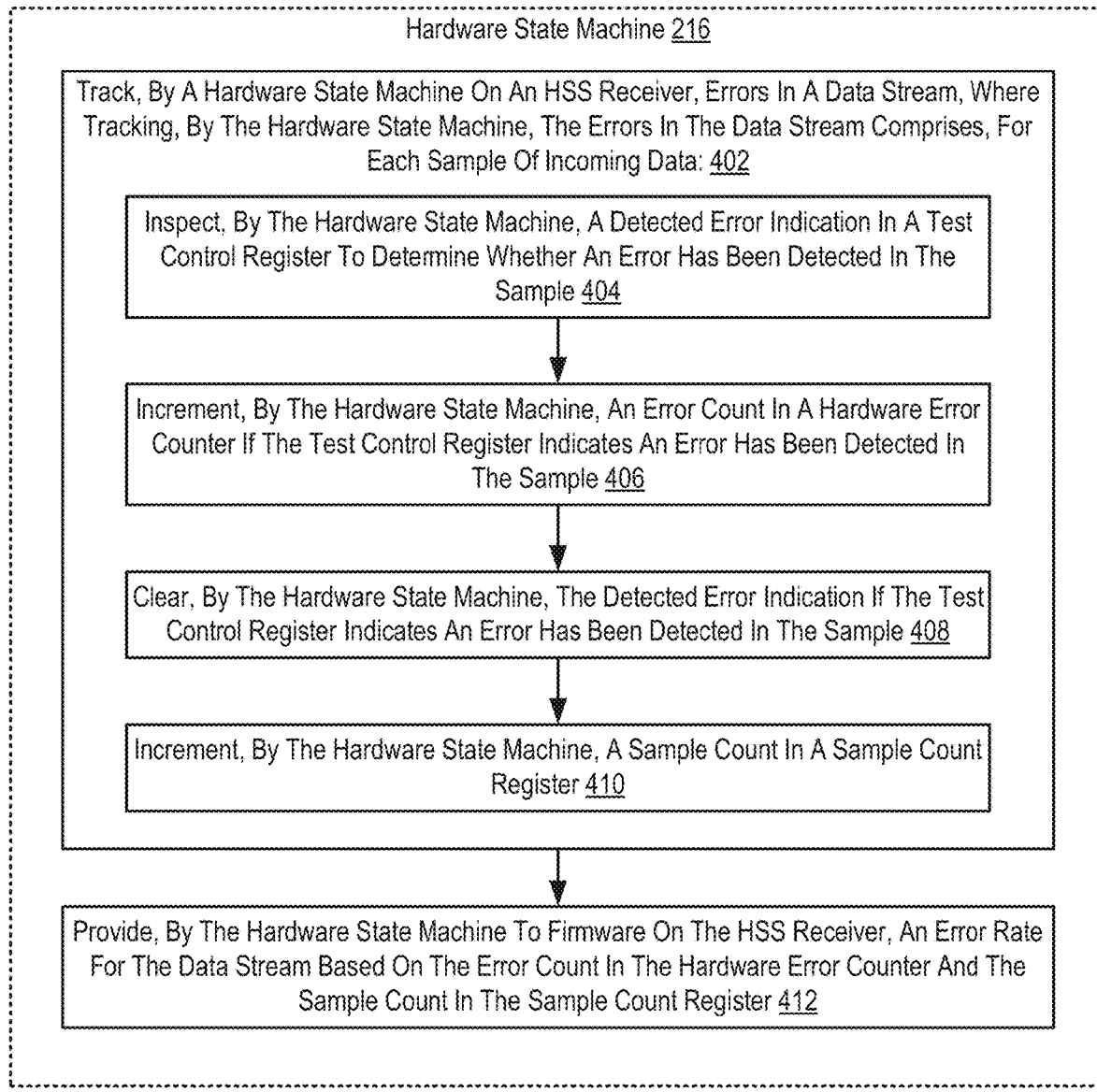
FIG. 4 sets forth a flow chart illustrating an exemplary method for hardware error detection on a HSS connection according to embodiments of the present invention.

For further explanation, FIG. 4 sets forth a flow chart illustrating an exemplary method for hardware error detection on a HSS connection according to embodiments of the present invention that includes tracking (402), by a hardware state machine (216) on a HSS receiver, errors in a data stream. Tracking (402), by a hardware state machine (216) on a HSS receiver, errors in a data stream may be carried out by initiating a data stream to the HSS receiver and initiating error testing by error detecting logic on the high-speed SerDes and the hardware state machine (216). Initiating testing by the hardware state machine (216) may be carried out by firmware for the HSS receiver sending a signal to the hardware state machine (216) to begin tracking errors in the data stream. The firmware may also provide a stop condition to the hardware state machine (216) indicating a point at which error tracking is to be stopped. A sample of incoming data is a portion of the incoming data that has been tested for an error by error detecting logic (e.g., within the high-speed SerDes).

The method of FIG. 4 further includes inspecting (404), by the hardware state machine (216), a detected error indicator in a test control register to determine whether an error has been detected in the sample. Inspecting (404), by the hardware state machine (216), a detected error indicator in a test control register to determine whether an error has been detected in the sample may be carried out by the hardware state machine (216) accessing a test control interface to read the detected error indicator. The hardware state machine (216) may use an address and control signals for the test control interface targeting the detected error indicator. Once the detected error indictor has been inspected by the hardware state machine (216), the hardware state machine (216) may transition to a different state as discussed above with regard to FIG. 3.

The high-speed SerDes may include error detecting logic that compares the incoming data stream to an expected pattern of expected data. If a portion of the data stream does not match the test pattern, then the error detecting logic activates the detected error indicator in the test control register. The data stream received may be a test pattern sent from a HSS transmitter to test the HSS link. Errors may be caused by, for example, interference on the HSS link, length of the HSS link, or incompatible HSS receiver or HSS transmitter settings.

The method of FIG. 4 further includes incrementing (406), by the hardware state machine (216), an error count in a hardware error counter if the test control register indicates an error has been detected in the sample. Incrementing (406), by the hardware state machine (216), an error count in a hardware error counter if the test control register indicates an error has been detected in the sample may be carried out by determining whether the detected error indicator in the test control register indicates that an error has been detected. Determining whether the detected error indicator in the test control register indicates that an error has been detected may include determining whether the detected error indicator is active (i.e., a "high" or "1" bit). If the detected error indictor is active, then the hardware state machine (216) increments the error count in the hardware error counter. The error count in the hardware error counter may be incremented by adding one to the current value of the error count. Once the error count has been incremented, the hardware state machine (216) may transition to a different state as discussed above with regard to FIG. 3.

The method of FIG. 4 further includes clearing (408), by the hardware state machine (216), the detected error indicator if the test control register indicates an error has been detected in the sample. Clearing (408), by the hardware state machine (216), the detected error indicator if the test control register indicates an error has been detected in the sample may be carried out by deactivating the detected error indicator in the test control register.

Clearing (408), by the hardware state machine (216), the detected error indicator if the test control register indicates an error has been detected in the sample may also be carried out by toggling or activating a detected error indictor reset in the test control register. The hardware state machine (216) may be unable to directly deactivate the detected error indicator in the test control register. Instead, the hardware state machine (216) may request that the detected error indicator be deactivated by toggling or activating the detected error indictor reset, which triggers logic within or associated with the test control register to deactivate the detected error indicator. Once the detected error indicator has been cleared, the hardware state machine (216) may transition to a different state as discussed above with regard to FIG. 3.

The method of FIG. 4 further includes incrementing (410), by the hardware state machine (216), a sample count in a sample count register. Incrementing (410), by the hardware state machine (216), a sample count in a sample count register may be carried out by adding one to the current value of the sample count. Incrementing (410), by the hardware state machine (216), a sample count in a sample count register may be performed regardless of whether the test control register indicates an error has been detected in the sample. The hardware state machine (216) may continue to track errors in the data stream until a stop condition is met. Once the sample count has been incremented, the hardware state machine (216) may transition to a different state as discussed above with regard to FIG. 3.

The method of FIG. 4 further includes providing (412), by the hardware state machine (216) to firmware on the HSS receiver, an error rate for the data stream based on the error count in the hardware error counter and the sample count in the sample count register. Providing (412), by the hardware state machine (216) to firmware on the HSS receiver, an error rate for the data stream based on the error count in the hardware error counter and the sample count in the sample count register may be carried out by receiving a read a request for the error rate or targeting the error count in the hardware error counter and the sample count in the sample count register. The error rate may be provided by as a ratio of error count to sample count.

For example, assume that a HSS transmitter sends a test pattern to a HSS receiver. Firmware on the HSS receiver initiates testing by the hardware state machine (216). The high-speed SerDes on the HSS receiver receives a first sample of the test pattern and compares the received sample to the corresponding portion of the expected test pattern. The high-speed SerDes also actives the pattern synchronization indicator in the test control register. Assume that the first sample includes no detected errors, so the detected error indicator remains inactive.

The hardware state machine (216) enters state A and inspects the detected error indicator in the test control register and determines that the detected error indicator is inactive. Because the detected error indicator is inactive, the hardware state machine (216) does not increment the error count in the hardware error counter and does not clear the detected error indicator. The hardware state machine (216) transitions to state D and increments the sample count in the sample count register from 0 to 1. The hardware state machine (216) detects no stopping condition and transitions back to state A.

Continuing with the example, the high-speed SerDes then receives a second sample of the test pattern and compares the received sample to the corresponding portion of the expected test pattern. Assume that the second sample does not match the expected test pattern and therefore includes an error. The high-speed SerDes activates the detected error indicator.

The hardware state machine (216) reenters state A and inspects the detected error indicator in the test control register and determines that the detected error indicator is active. The hardware state machine (216) transitions to state B and increments the error count in the hardware error counter from 0 to 1. The hardware state machine (216) transitions to state C and clears the detected error indicator by activating the detected error indicator reset in the test control register. Logic within the test control register then deactivates the detected error indicator. The hardware state machine (216) then transitions to state D and increments the sample count in the sample count register from 1 to 2. The hardware state machine (216) detects no stopping condition and transitions back to state A.

Continuing with the example, the high-speed SerDes then receives a third sample of the test pattern and compares the received sample to the corresponding portion of the expected test pattern. Assume that the third sample does not match the expected test pattern and therefore includes an error. The high-speed SerDes activates the detected error indicator.

The hardware state machine (216) reenters state A and inspects the detected error indicator in the test control register and determines that the detected error indicator is active. The hardware state machine (216) transitions to state B and increments the error count in the hardware error counter from 1 to 2. The hardware state machine (216) transitions to state C and clears the detected error indicator by activating the detected error indicator reset in the test control register. Logic within the test control register then deactivates the detected error indicator. The hardware state machine (216) then transitions to state D and increments the sample count in the sample count register from 2 to 3. The hardware state machine (216) detects no stopping condition and transitions back to state A.

Continuing with the example, the high-speed SerDes then receives a fourth sample of the test pattern and compares the received sample to the corresponding portion of the expected test pattern. Assume that the forth sample includes no detected errors, so the detected error indicator remains inactive.

The hardware state machine (216) reenters state A and inspects the detected error indicator in the test control register and determines that the detected error indicator is inactive. Because the detected error indicator is inactive, the hardware state machine (216) does not increment the error count in the hardware error counter and does not clear the detected error indicator. The hardware state machine (216) transitions to state D and increments the sample count in the sample count register from 3 to 4. Assume that the hardware state machine (216) then detects a stopping condition and ends the test. The hardware state machine (216) then provides, to the firmware on the HSS receiver, the error rate for the four samples of the incoming data stream in the form of a ratio of 2 errors detected in 4 samples.

Because the hardware state machine (216) is operating just above the physical layer and accessing the test control register directly, the hardware state machine (216) is able to count errors and reset the detected error indictor at a faster rate than firmware or other elements on the HSS receiver. In contrast, by the time the firmware is able to read and record an error from the detected error indicator, the error detecting logic within the high-speed SerDes may have detected additional errors and attempted to reactive the detected error indicator. The firmware may not have been able to record the additional errors.

For further explanation, FIG. 5 sets forth a flow chart illustrating a further exemplary method for hardware error detection on a HSS connection according to embodiments of the present invention that includes tracking (402), by a hardware state machine (216) on a HSS receiver, errors in a data stream, wherein tracking, by the hardware state machine (216), the errors in the data stream comprises, for each sample of incoming data: inspecting (404), by the hardware state machine (216), a detected error indicator in a test control register to determine whether an error has been detected in the sample; incrementing (406), by the hardware state machine (216), an error count in a hardware error counter if the test control register indicates an error has been detected in the sample; clearing (408), by the hardware state machine (216), the detected error indicator if the test control register indicates an error has been detected in the sample; and incrementing (410), by the hardware state machine (216), a sample count in a sample count register; and providing (412), by the hardware state machine (216) to firmware on the HSS receiver, an error rate for the data stream based on the error count in the hardware error counter and the sample count in the sample count register.

The method of FIG. 5 differs from the method of FIG. 4, however, in that inspecting (404), by the hardware state machine (216), a detected error indicator in a test control register to determine whether an error has been detected in the sample includes inspecting (502), by the hardware state machine (216), a pattern synchronization indicator to determine whether a test is active. Inspecting (502), by the hardware state machine (216), a pattern synchronization indicator to determine whether a test is active may be carried out by the hardware state machine (216) accessing a test control interface to read the detected error indicator. The hardware state machine (216) may use an address and control signals for the test control interface targeting the pattern synchronization indicator.

The method of FIG. 5 also differs from the method of FIG. 4 in that incrementing (406), by the hardware state machine (216), an error count in a hardware error counter if the test control register indicates an error has been detected in the sample includes pulsing (504) an input signal for the hardware error counter for at least one clock cycle. Pulsing (504) an input signal for the hardware error counter for at least one clock cycle may be carried out by the hardware state machine (216) directing a clock pulse to the input signal for the hardware error counter. The pulse may be active for one cycle or more than one cycle in order to increment the error count one unit.

The method of FIG. 5 also differs from the method of FIG. 4 in that incrementing (410), by the hardware state machine (216), a sample count in a sample count register pulsing (506) an input signal for the sample count register for at least one clock cycle. Pulsing (506) an input signal for the sample count register for at least one clock cycle may be carried out by the hardware state machine (216) directing a clock pulse to the input signal for the sample count register. The pulse may be active for one cycle or more than one cycle in order to increment the sample count one unit.

The hardware state machine (216) may record detected errors very quickly and in very few clock cycles. Each error indicated in the test control register may be recorded in the hardware error counter, the sample count may be incremented, and the detected error indicator may be reset, during a single clock cycle or in very few clock cycles. Therefore, the hardware state machine (216) is prepared to record an additional error or error-free sample in time for the error detecting logic to evaluate another data sample.

Figure 6:
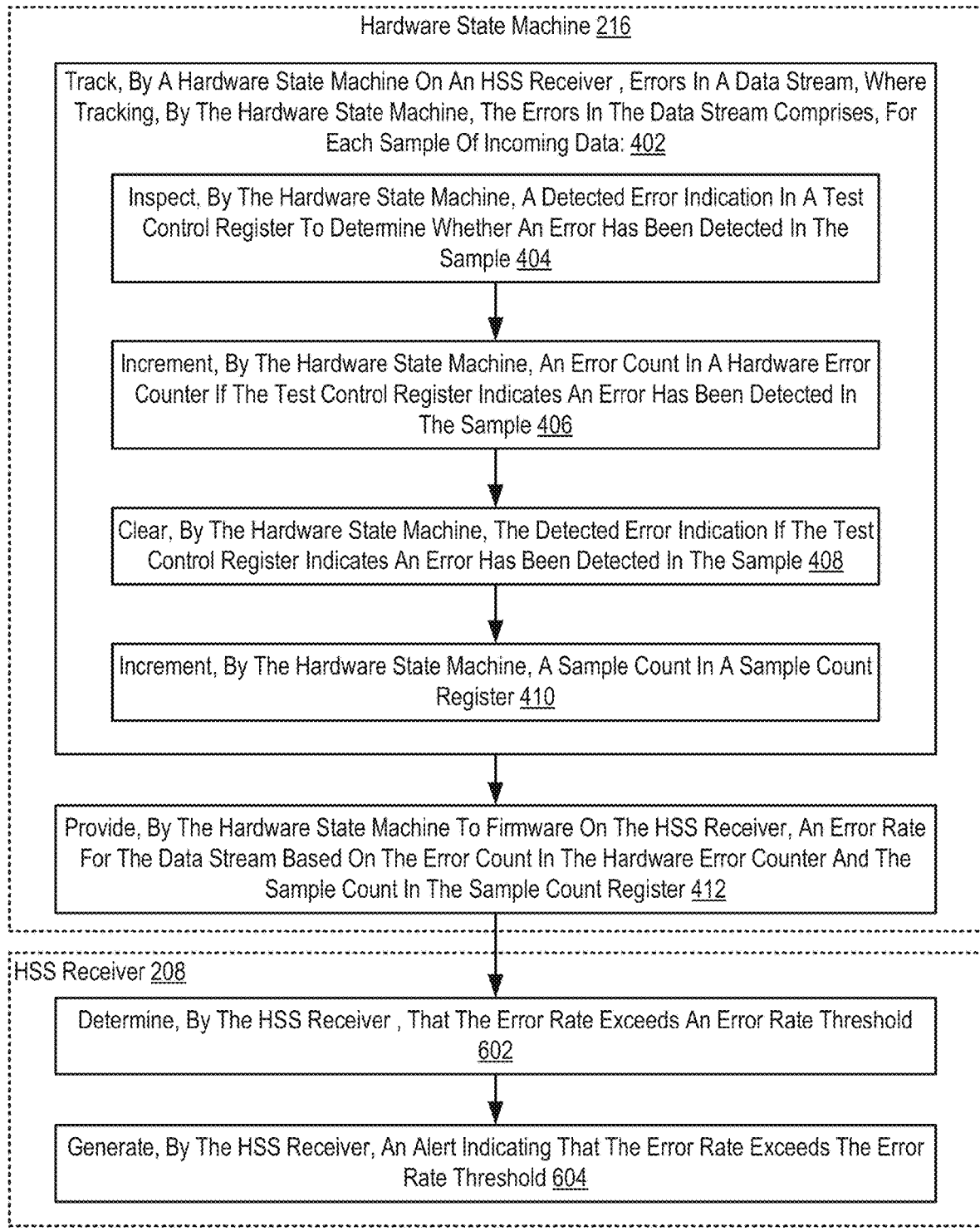
FIG. 6 sets forth a flow chart illustrating an exemplary method for hardware error detection on a HSS connection according to embodiments of the present invention.

For further explanation, FIG. 6 sets forth a flow chart illustrating a further exemplary method for hardware error detection on a HSS connection according to embodiments of the present invention that includes tracking (402), by a hardware state machine (216) on a HSS receiver, errors in a data stream, wherein tracking, by the hardware state machine (216), the errors in the data stream comprises, for each sample of incoming data: inspecting (404), by the hardware state machine (216), a detected error indicator in a test control register to determine whether an error has been detected in the sample; incrementing (406), by the hardware state machine (216), an error count in a hardware error counter if the test control register indicates an error has been detected in the sample; clearing (408), by the hardware state machine (216), the detected error indicator if the test control register indicates an error has been detected in the sample; and incrementing (410), by the hardware state machine (216), a sample count in a sample count register; and providing (412), by the hardware state machine (216) to firmware on the HSS receiver, an error rate for the data stream based on the error count in the hardware error counter and the sample count in the sample count register.

The method of FIG. 6 differs from the method of FIG. 4, however, in that the method of FIG. 6 further includes determining (602), by the HSS receiver (208), that the error rate exceeds an error rate threshold; and generating (604), by the HSS receiver (208), an alert indicating that the error rate exceeds the error rate threshold.

Determining (602), by the HSS receiver (208), that the error rate exceeds an error rate threshold may be carried out by comparing, by logic on the HSS receiver (208) the received error rate, that includes the sample count and error count, to a value representing a threshold error rate. The threshold error rate may be a tolerable number of errors per sample size. An error rate that exceeds the error rate threshold may indicate that the effective transfer rate of data on the HSS receiver is below a specification for the HSS receiver.

Generating (604), by the HSS receiver (208), an alert indicating that the error rate exceeds the error rate threshold may be carried out by notifying an element on the HSS receiver, an element on the receiving device, or a user that the error rate exceeds the error rate threshold. The element (e.g., a hardware component, a software component, or an application) may, in response, take action to reduce the error rate. For example, in response to the alert, an application on the receiving device may, automatically and without user intervention, adjust the settings on the HSS receiver, implement interference reduction processes, and/or reduce the length of the HSS link.

In view of the explanations set forth above, readers will recognize that the benefits of hardware error detection on a HSS connection according to embodiments of the present invention include:

Improving the operation of a computing system by tracking errors detected on a high-speed serial receiver and providing an error rate to higher-level elements on the high-speed serial receiver, increasing computing system reliability.

Improving the operation of a computing system by recording errors detected by physical layer elements at the boundary between the physical layer and the link layer, thereby recording errors faster than higher-level elements such as firmware, increasing error tracking accuracy and computing system functionality.

Exemplary embodiments of the present invention are described largely in the context of a fully functional computer system for hardware error detection on a high-speed serial (HSS) connection. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of hardware error detection on a high-speed serial (HSS) connection, the method comprising:
    tracking, by a hardware state machine on a HSS receiver, errors in a data stream, wherein each sample of incoming data being tracked by the hardware state machine has been tested for errors by error detecting logic, and wherein tracking, by the hardware state machine, the errors in the data stream comprises, for each sample of incoming data:
        inspecting, by the hardware state machine, a detected error indicator in a test control register to determine whether an error has been detected in the sample;
        incrementing, by the hardware state machine, an error count in a hardware error counter if the test control register indicates an error has been detected in the sample;
        clearing, by the hardware state machine, the detected error indicator if the test control register indicates an error has been detected in the sample; and incrementing, by the hardware state machine, a sample count in a sample count register; and
    providing, by the hardware state machine to firmware on the HSS receiver, an error rate for the data stream based on the error count in the hardware error counter and the sample count in the sample count register.

2. The method of claim 1, wherein the hardware state machine is a hardware component of an integrated circuit within the HSS receiver, and wherein the integrated circuit further comprises a high-speed serializer/deserializer operating at a physical layer of a high-speed serial protocol.

3. The method of claim 1, wherein incrementing, by the hardware state machine, the error count in the hardware error counter comprises pulsing an input signal for the hardware error counter for at least one clock cycle.

4. The method of claim 1, wherein incrementing, by the hardware state machine, the sample count in the sample count register comprises pulsing an input signal for the sample count register for at least one clock cycle.

5. The method of claim 1, wherein inspecting, by the hardware state machine, the detected error indicator in the test control register to determine whether an error has been detected in the sample comprises inspecting, by the hardware state machine, a pattern synchronization indicator to determine whether a test is active.

6. The method of claim 1, further comprising:
    determining, by the HSS receiver, that the error rate exceeds an error rate threshold; and
    generating, by the HSS receiver, an alert indicating that the error rate exceeds the error rate threshold.

7. The method of claim 1, wherein the hardware state machine, the test control register, the hardware error counter, and the sample count register are hardware components of an integrated circuit within the HSS receiver, and wherein the hardware state machine comprises four states: state A, state B, state C, and state D, wherein:
    state A corresponds with inspecting, by the hardware state machine, the detected error indicator in the test control register to determine whether an error has been detected in the sample;
    state B corresponds with incrementing, by the hardware state machine, the error count in the hardware error counter;
    state C corresponds with clearing, by the hardware state machine, the detected error indicator; and
    state D corresponds with incrementing, by the hardware state machine, the sample count in the sample count register.

8. An integrated circuit for hardware error detection on a high-speed serial (HSS) connection, wherein the integrated circuit comprises a hardware state machine on a HSS receiver, and wherein the integrated circuit is configured to carry out the steps of:
    tracking, by the hardware state machine, errors in a data stream, wherein each sample of incoming data being tracked by the hardware state machine has been tested for errors by error detecting logic, wherein tracking, by the hardware state machine, the errors in the data stream comprises, for each sample of incoming data:
inspecting, by the hardware state machine, a detected error indicator in a test control register to determine whether an error has been detected in the sample;
incrementing, by the hardware state machine, an error count in a hardware error counter if the test control register indicates an error has been detected in the sample;
clearing, by the hardware state machine, the detected error indicator if the test control register indicates an error has been detected in the sample; and
incrementing, by the hardware state machine, a sample count in a sample count register; and
providing, by the hardware state machine to firmware on the HSS receiver, an error rate for the data stream based on the error count in the hardware error counter and the sample count in the sample count register.

9. The integrated circuit of claim 8, wherein the hardware state machine is a hardware component of an integrated circuit within the HSS receiver, and wherein the integrated circuit further comprises a high-speed serializer/deserializer operating at a physical layer of a high-speed serial protocol.

10. The integrated circuit of claim 8, wherein incrementing, by the hardware state machine, the error count in the hardware error counter comprises pulsing an input signal for the hardware error counter for at least one clock cycle.

11. The integrated circuit of claim 8, wherein incrementing, by the hardware state machine, the sample count in the sample count register comprises pulsing an input signal for the sample count register for at least one clock cycle.

12. The integrated circuit of claim 8, wherein inspecting, by the hardware state machine, the detected error indicator in the test control register to determine whether an error has been detected in the sample comprises inspecting, by the hardware state machine, a pattern synchronization indicator to determine whether a test is active.

13. The integrated circuit of claim 8, further comprising:
determining, by the HSS receiver, that the error rate exceeds an error rate threshold; and
generating, by the HSS receiver, an alert indicating that the error rate exceeds the error rate threshold.

14. The integrated circuit of claim 8, wherein the hardware state machine, the test control register, the hardware error counter, and the sample count register are hardware components of an integrated circuit within the HSS receiver, and wherein the hardware state machine comprises four states: state A, state B, state C, and state D, wherein:
state A corresponds with inspecting, by the hardware state machine, the detected error indicator in the test control register to determine whether an error has been detected in the sample;
state B corresponds with incrementing, by the hardware state machine, the error count in the hardware error counter;
state C corresponds with clearing, by the hardware state machine, the detected error indicator; and
state D corresponds with incrementing, by the hardware state machine, the sample count in the sample count register.

15. A computer program product for hardware error detection on a high-speed serial (HSS) connection, the computer program product disposed upon a computer readable medium, the computer program product comprising computer program instructions that, when executed, cause an integrated circuit to carry out the steps of:
tracking, by a hardware state machine on a HSS receiver, errors in a data stream, wherein each sample of incoming data being tracked by the hardware state machine has been tested for errors by error detecting logic, wherein tracking, by the hardware state machine, the errors in the data stream comprises, for each sample of incoming data:
inspecting, by the hardware state machine, a detected error indicator in a test control register to determine whether an error has been detected in the sample;
incrementing, by the hardware state machine, an error count in a hardware error counter if the test control register indicates an error has been detected in the sample;
clearing, by the hardware state machine, the detected error indicator if the test control register indicates an error has been detected in the sample; and
incrementing, by the hardware state machine, a sample count in a sample count register; and
providing, by the hardware state machine to firmware on the HSS receiver, an error rate for the data stream based on the error count in the hardware error counter and the sample count in the sample count register.

16. The computer program product of claim 15, wherein the hardware state machine is a hardware component of an integrated circuit within the HSS receiver, and wherein the integrated circuit further comprises a high-speed serializer/deserializer operating at a physical layer of a high-speed serial protocol.

17. The computer program product of claim 15, wherein incrementing, by the hardware state machine, the error count in the hardware error counter comprises pulsing an input signal for the hardware error counter for at least one clock cycle.

18. The computer program product of claim 15, wherein incrementing, by the hardware state machine, the sample count in the sample count register comprises pulsing an input signal for the sample count register for at least one clock cycle.

19. The computer program product of claim 15, wherein inspecting, by the hardware state machine, the detected error indicator in the test control register to determine whether an error has been detected in the sample comprises inspecting, by the hardware state machine, a pattern synchronization indicator to determine whether a test is active.

20. The computer program product of claim 15, further comprising:
determining, by the HSS receiver, that the error rate exceeds an error rate threshold; and
generating, by the HSS receiver, an alert indicating that the error rate exceeds the error rate threshold.

* * * * *